US012711520B2

(12) United States Patent
Lam et al.

(10) Patent No.: US 12,711,520 B2
(45) Date of Patent: Aug. 18, 2026

(54) SYSTEMS AND METHODS FOR DYNAMIC PRICING

(71) Applicant: ServiceTitan, Inc., Glendale, CA (US)

(72) Inventors: Wing Lam, San Gabriel, CA (US); Eyal Binshtock, Los Angeles, CA (US); Denis Bogdanov, Glendale, CA (US)

(73) Assignee: ServiceTitan, Inc., Glendale, CA (US)

( * ) Notice: Subject to any disclaimer, the term of this patent is extended or adjusted under 35 U.S.C. 154(b) by 63 days.

(21) Appl. No.: 17/985,700

(22) Filed: Nov. 11, 2022

(65) Prior Publication Data

US 2023/0143975 A1 May 11, 2023

Related U.S. Application Data

(60) Provisional application No. 63/278,408, filed on Nov. 11, 2021.

(51) Int. Cl.
*G06Q 30/0201* (2023.01)
*G06Q 30/0283* (2023.01)
*G06Q 30/0601* (2023.01)

(52) U.S. Cl.
CPC ..... *G06Q 30/0206* (2013.01); *G06Q 30/0283* (2013.01); *G06Q 30/0631* (2013.01); *G06Q 30/0633* (2013.01)

(58) Field of Classification Search
CPC ........... G06Q 30/0206; G06Q 30/0631; G06Q 30/0633; G06Q 30/0283
USPC ........................................................ 705/400
See application file for complete search history.

(56) References Cited

U.S. PATENT DOCUMENTS

2004/0153356 A1 8/2004 Lockwood et al.
2012/0330696 A1 12/2012 Clark et al.
2013/0144675 A1* 6/2013 Ellis .................. G06Q 10/0631 705/7.19
2013/0218614 A1 8/2013 Weinstock et al.
2013/0325541 A1 12/2013 Capriotti et al.
2018/0114154 A1* 4/2018 Bae ...................... G06Q 10/067
2020/0125635 A1* 4/2020 Nuolf ..................... G06N 20/20
2021/0312559 A1 10/2021 Leise

OTHER PUBLICATIONS

Beladev, et al., Recommender Systems for Product Bundling 111 Knowledge-Based Systems 193 (2016) (Year: 2016).*

* cited by examiner

*Primary Examiner* — Charles Guiliano
(74) *Attorney, Agent, or Firm* — BakerHostetler

(57) ABSTRACT

The present invention relates to systems, methods, and machine-readable media for dynamically generating pricing estimates. A process of the disclosed technology includes steps for accessing a pricebook at a remote server, receiving information indicative of a selection for one or more purchase items, generating an estimate for a service comprising one or more purchase items in the pricebook, executing a service adjustment based on the one or more or more selected purchase items, and updating the estimate based on the service adjustment.

20 Claims, 13 Drawing Sheets

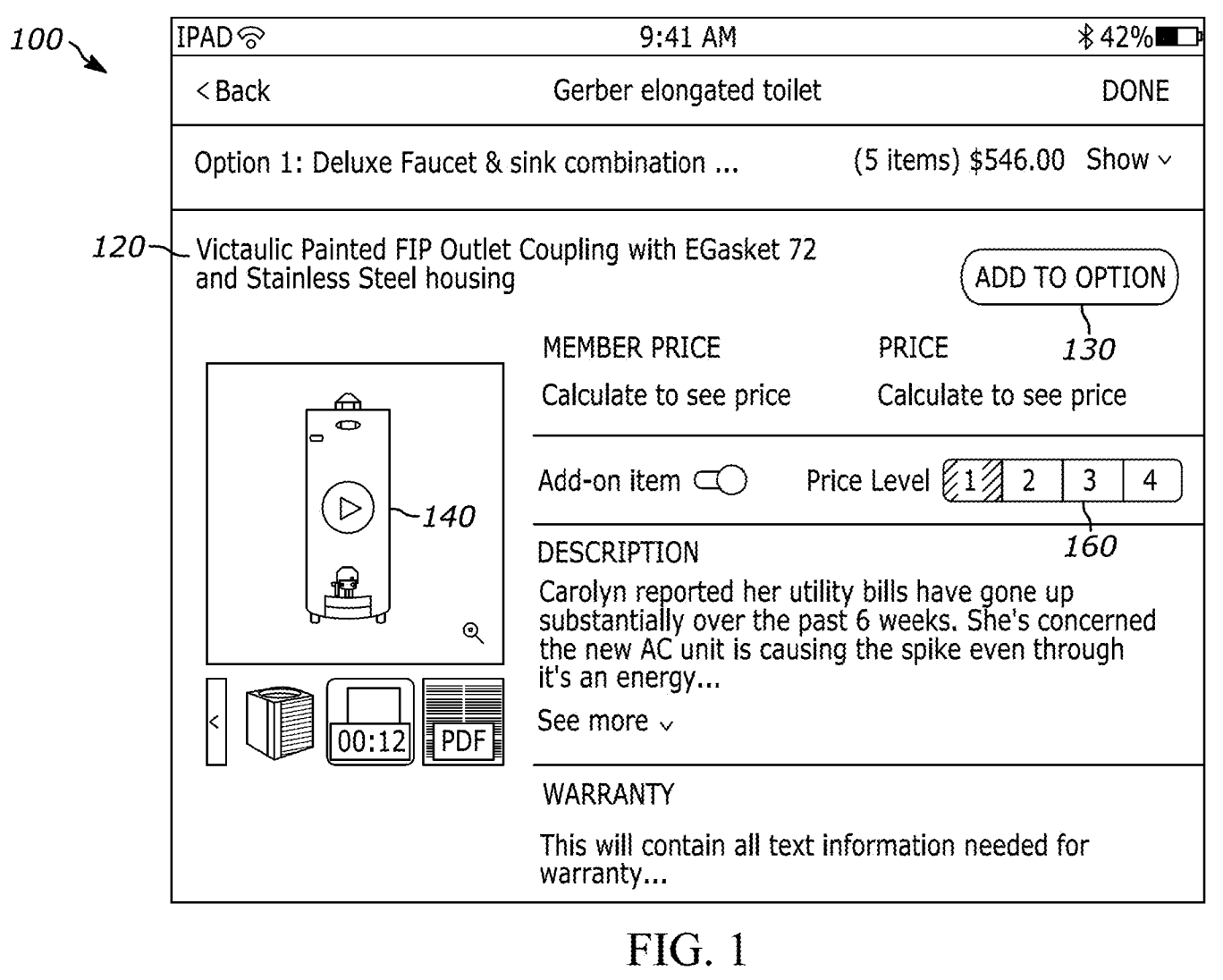

100

IPAD 9:41 AM 42%

< Back Gerber elongated toilet DONE

Option 1: Deluxe Faucet & sink combination ... (5 items) $546.00 Show ˅

120 Victaulic Painted FIP Outlet Coupling with EGasket 72 and Stainless Steel housing

ADD TO OPTION 130

140

MEMBER PRICE
Calculate to see price

PRICE
Calculate to see price

Add-on item

Price Level 1 2 3 4 160

DESCRIPTION
Carolyn reported her utility bills have gone up substantially over the past 6 weeks. She's concerned the new AC unit is causing the spike even through it's an energy...
See more ˅

00:12

PDF

WARRANTY
This will contain all text information needed for warranty...

FIG. 1

Categories —— Billable Rate —— 3 Markup —— 4 Surcharge —— 5 Review & Add Modifiers What's your billable rate?

ServiceTitan will use your labor rate and sold hours for services to calculate labor for your service price.

Selected categories

Plumbing Drain

Billable rate

Figure 4C:
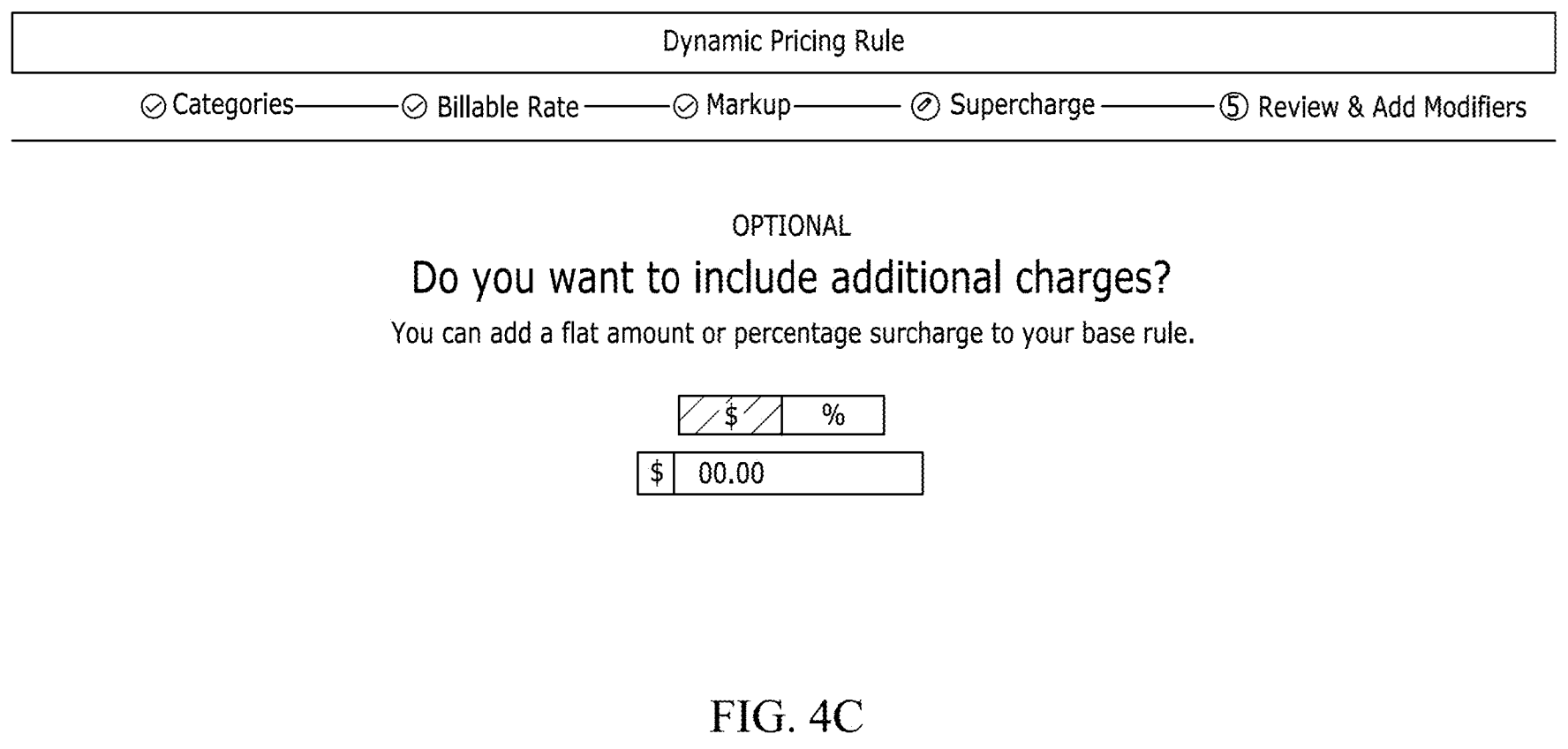

Dynamic Pricing Rule

Categories — Billable Rate — Markup — Supercharge — 5 Review & Add Modifiers

OPTIONAL

Do you want to include additional charges?

You can add a flat amount or percentage surcharge to your base rule.

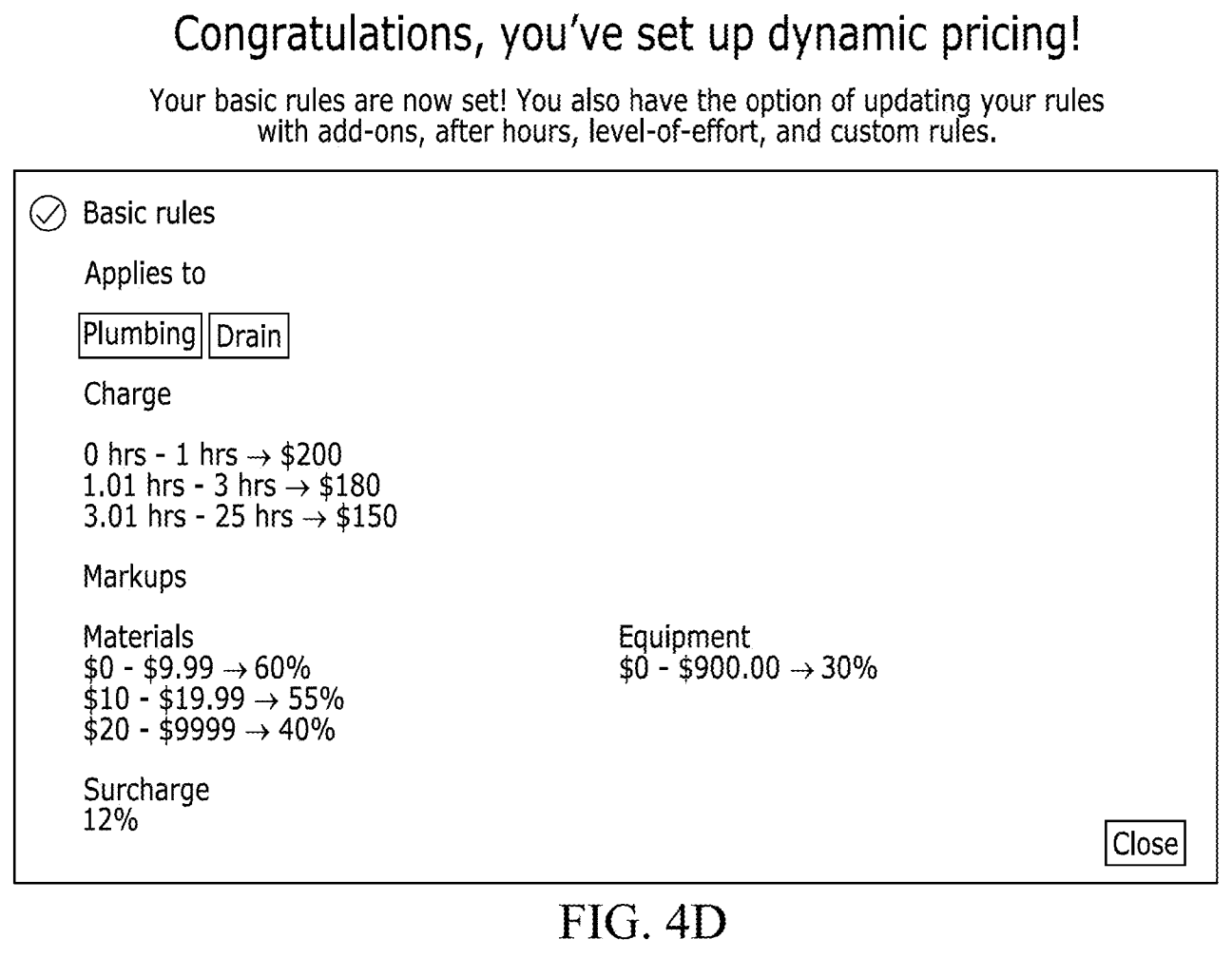

Congratulations, you've set up dynamic pricing!

Your basic rules are now set! You also have the option of updating your rules with add-ons, after hours, level-of-effort, and custom rules.

Basic rules

Applies to

Plumbing Drain

Charge 0 hrs - 1 hrs → $200
1.01 hrs - 3 hrs → $180
3.01 hrs - 25 hrs → $150

Markups

Materials
$0 - $9.99 → 60%
$10 - $19.99 → 55%
$20 - $9999 → 40%

Equipment
$0 - $900.00 → 30%

Surcharge
12%

Close

FIG. 4D

FIG. 5A
Select modifications to set up
You can add discounts or surcharges for any of these scenarios.
Add-On Pricing
For services that technicians mark as additional to another task.
510
After Hours
For when services are performed outside of normal business hours
520
Price Level
For when services require additional effort or expertise
530
Static Prices
Exclude services from this rule.
540

SYSTEMS AND METHODS FOR DYNAMIC PRICING

PRIORITY CLAIM

This application claims priority to and the benefit of U.S. Provisional Application No. 63/278,408 filed Nov. 11, 2021, entitled "SYSTEMS AND METHODS FOR DYNAMIC PRICING". The above-referenced application is hereby incorporated by reference in its entirety.

TECHNICAL FIELD

The subject technology provides solutions for generating recommendations and estimates for services, and in particular, dynamically updating cost estimates based on pricing adjustments.

BACKGROUND

In the service and repair industry, estimates are often created to provide customers with a quote for the product and service costs required by a particular job. Such estimates can be prepared electronically and utilize an electronic catalog comprising a plurality of available products and services. However, the creation of estimates can be tedious and inefficient since technicians must manually search for and add each item to an estimate. In addition, the technician must identify all items associated with the service, which requires extensive knowledge and memory of both the service being quoted and the electronic catalog, which may comprise hundreds or thousands of products and services.

Any deviations from defined products and services add another layer of difficulty and inefficiency since technicians must manually edit any differences and/or create a custom invoice for the particular service. As a result, there is a need to ease the burden on the technician and provide improved, efficient methods for developing estimates.

SUMMARY

Disclosed herein are systems and methods for dynamic price adjustments. Embodiments can quickly and easily set pricing across an entire pricebook with operations and automation to keep pricing up to date. Dynamic pricing adjustments are time-efficient and can provide significant financial benefits. Through dynamic pricing operations, financial margins can be set, and unique service scenarios, such as after-hours pricing, add-on pricing, recommendations, price/difficulty levels, static prices, and dynamic prices can be applied. Embodiments include user-friendly interfaces, with easy set-up, intuitive operation, and functionality that keeps prices for goods and services up to date.

Embodiments include systems and methods including one or more processors and a computer-readable medium comprising instructions stored therein. Systems and methods perform operations including but not limited to: accessing a pricebook at a remote server, wherein the pricebook assigns prices to purchase items; receiving information indicative of a selection for one or more purchase items; generating an estimate for a service comprising one or more purchase items in the pricebook; executing a service adjustment based on the one or more or more selected purchase items; and updating the estimate based on the service adjustment.

In embodiments, the purchase items can include at least one of a good, a service, and a time of service. A good can include at least one of a material expense, an equipment expense, a rental expense, an insurance expense, and a vehicle fee. A service can include at least one of: a labor expense, an hourly rate, and an additional task. In embodiments, the service adjustment can relate to one or more of: a time of service, a difficulty level, an additional charge, and an add-on task. In some embodiments, when the time of service is outside a predefined time range, a surcharge is added to at least one of the labor expense and the hourly rate. In additional embodiments, a difficulty level can increase the estimate by at least one of a fixed amount, and a percentage cost increase of the service.

In additional embodiments, systems and methods can include identifying one or more defined rules associated with the selected one or more purchase items, the rules being associated with price adjustments; and applying the one or more defined rules to applicable service items in the estimate.

It will be appreciated that embodiments in accordance with the present invention can utilize one or more computing devices, including but not limited to a mobile computing device, a smartphone, a tablet, and an interactive display, among others. In examples, recommended service items can be added to the estimate in response to a selection on a user interface, such as a touch screen user interface.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 1 illustrates an example user interface for generating estimates, in accordance with various embodiments discussed herein.

FIG. 4C illustrates an example of a dynamic pricing adjustment for miscellaneous charges, in accordance with embodiments.

FIG. 4D illustrates an example of a dynamic pricing summary, in accordance with embodiments.

DETAILED DESCRIPTION

Figure 2:
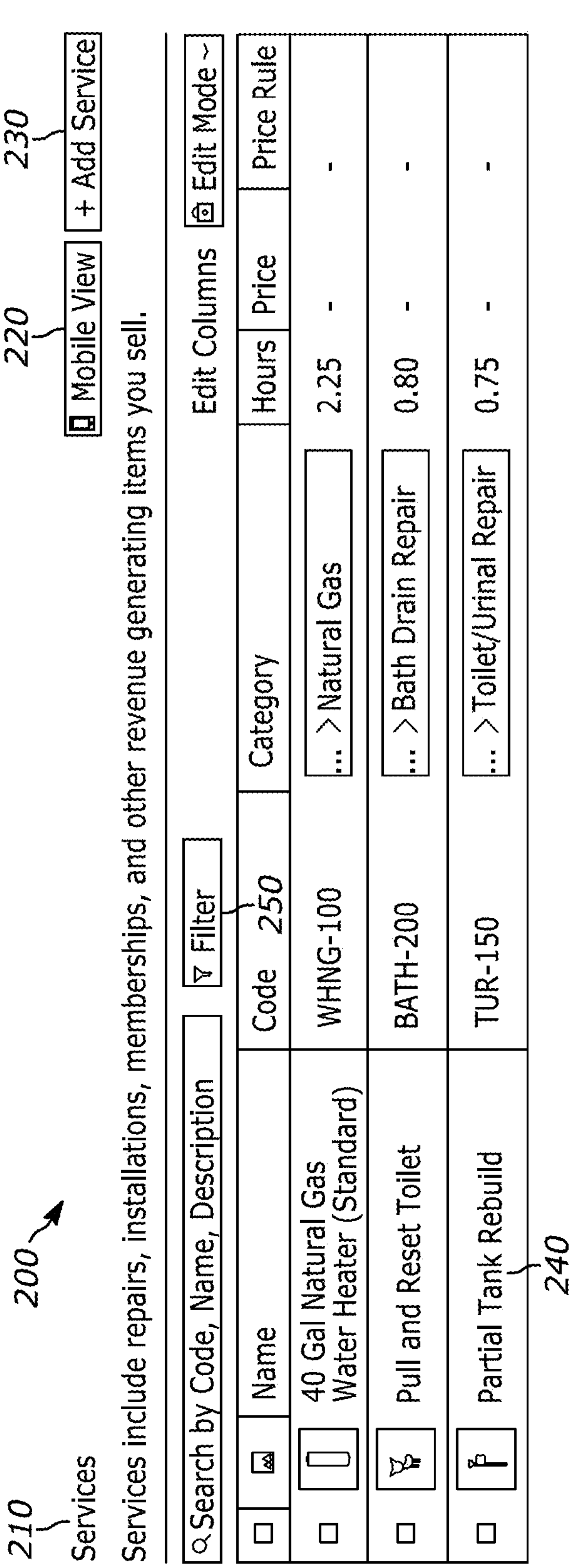
FIG. 2 illustrates an example user interface providing service items in accordance with embodiments.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present systems and methods relate to systems and methods for generating dynamic pricing adjustments, which can be applied, for example, to estimates for services. Systems and methods can be executed on one or more computing systems, including but not limited to applications on smartphones, tablets, and other mobile computing devices.

Systems and methods can assist technicians, service providers, and the like in scaling pricing systems and structures to automatically adjust for variations and changes to routine services and common situations. For example, the dynamic pricing systems can adjust and adapt to service scenarios such as after-hours services, additional services, billable rate adjustments, material markups, and the like. In various embodiments, users can define one or more rules or service adjustments to ensure an accurate service price generation, adjust for unexpected variables, and/or common scenarios. As a result, the robust system provides unique flexibility and adaptability to a variety of service scenarios, and provides users and technicians with an efficient method to capture a range of services and service adjustments.

FIG. 1 illustrates an example user interface for generating estimates 100. In embodiments, service items 120 can be added to the estimate 130, e.g., via a touch selection, button, or other method to indicate a selection. The service item 120 can be a product or service available in a pricebook. A pricebook can be a catalog of available items for purchase, and can be stored locally, remotely, on a cloud database, or other accessible server. As discussed herein, estimates record what technicians recommend and invoices record what customers actually purchase. The estimate 100 can be presented via an application or display on a computing device, such as a mobile computing device, tablet, smart phone, or other general computing device associated with a display.

In FIG. 1, the service item, a Victaulic painted FIP outlet coupling with EGasket 72 and stainless steel housing, can be further modified with customizations specific to the proposed job or service being quoted. Customizations can include price, quantity, indication of a type of item, e.g., an "add-on item," and the like. The estimate display can additionally provide a description of the product, specifications, and other information. In embodiments, service items can be searched for and identified via a search function. Items can be identified via one or more unique identifiers, such as a name, stock-keeping unit (SKU), and the like. Search functions can search the pricebook comprising all available service items to identify the desired product or service that the user desires.

When at least one service and/or service item 120 is selected and added to the estimate, the present invention can provide one or more recommended service items 110 to be added to the estimate. The recommended items 110 can easily be added to the estimate via a selection button 130. In embodiments, when an additional service item is added to the estimate, the present technology can update its service item recommendations based on the addition of the new item.

In various embodiments, the recommendation feature utilizes prior invoices to determine related items for recommendations. Recommended items can be items that are commonly sold with the selected service item(s). In embodiments, the recommended items are specifically associated with the service items included in the estimate. As discussed below, recommended items can be selected based off a manually-defined associated between the items. For example, one or more service items in the pricebook may be linked such that when one service item is added to an estimate, the linked service items are presented as recommendations. As such, estimates can be prepared quicker and more efficiently, since commonly-related items are easily accessible by the user or technician preparing the estimate. Recommendations can further promote additional sales by providing recommendations for service items related to the estimate being prepared, and offering a convenient, easy method for users or technicians to identify and include related service items that the customer may be interested in, and service items that the customer may likely be interested in or need, based on the service items in the estimate.

In various embodiments, options to provide additional information about the service or service item can be provided. A service or item can be defined as an "add-on item" 140, as discussed herein. Add-on items may or may not be a part of the initially anticipated service job. For example, if a technician were to arrive at a customer's location, and identify one or more additional items, such as an unexpected valve replacement or other unanticipated service, the product/service page can provide a button to designate the product or service as an add-on 140. In various embodiments, depending on the add-on product or service, prices for the product or service can be adjusted from a base rate or price. In other embodiments, the designation can be recorded for future reference, such as for smart recommendations, in later transactions.

In addition, embodiments can include a selected for a price level 160. The price level can correspond to a difficulty level, e.g., for installation. Higher difficulty levels can correspond to a higher price levels. In embodiments a higher difficulty level for a product can dynamically affect, and subsequently adjust one or more service items and services associated with the higher difficulty level. As such, a more accurate total estimate for the job can be generated.

FIG. 2 illustrates another example of a user interface depicting a plurality of services and products that can be added to an estimate. In the illustrated view, the user interface can comprise a listing of pricebook items 210, e.g., services, materials, goods, etc., that are associated with and listed in a pricebook. The services can be repairs, replacements, installations, memberships, and other revenue generating items.

Various embodiments of the user interface can comprise a toggle between a mobile view 220 and a desktop view. A search function 250 can be identify desired pricebook items 240 to be edited and/or added to an estimate. The search function can comprise optional filters to further narrow the search for desired service items. Service items that match the search can provide additional information such as a name, description, estimated hours for completion, price, member price, materials cost, and so forth. A button to Add Service 230 can add the service item to an estimate.

In embodiments, service items can be linked together to trigger a recommendation of the add-on service items when a first service item is added to an estimate. In embodiments, multiple pricebook items can be selected out of a plurality of available pricebook items. In examples, selected service items can be linked together to assist with recommendations when users prepare estimates.

Figure 3:
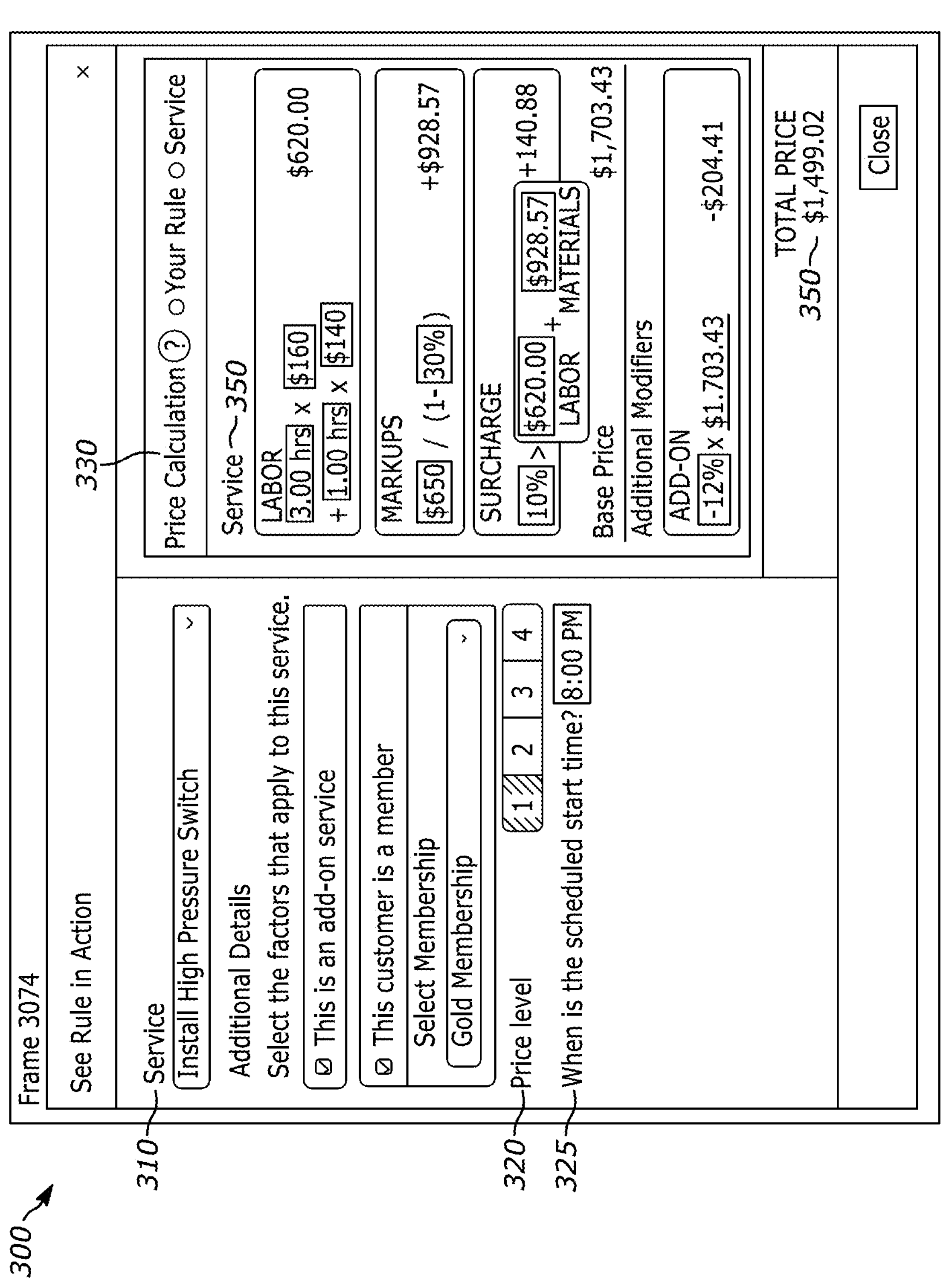
FIG. 3 illustrates an example user interface for applying rules and/or dynamic adjustments in accordance with embodiments.

FIG. 3 illustrates an example user interface for applying rules and/or dynamic adjustments 300. The rules can be indicative of one or more service adjustment and/or price adjustments for pricebook items included in an estimate. In embodiments, the user interface can provide information indicative of one or more of: a type of service, a type of customer, a difficulty/price level 320, a price calculation 330, a service price 350, a base price, and any additional modifers, such as add-on items. The interface can further provide a final price 350 as a result of implementing the defined rule. The total price 350 can be adjusted dynamically when one or more variables, as described herein, are edited.

With regard to the rule variables, the service box 310 identifies the service and/or product in the estimate to which the rule can apply. In embodiments, a drop-down box or button can allow a user to easily and efficiently switch between products and/or services added to the estimate. The selected item in the box will define the item to which the rule will apply. In the example illustrated in FIG. 3, the service item 310 is the installation of a high pressure switch.

Additional details can be provided, which indicate, for example, whether the service item is an add-on service and whether the customer is a certain type of member. Customer memberships can indicate that one or more dynamic adjustments, discounts, and the like should be applied. In the present example, the customer for which the estimate is being generated has a Gold Membership. This can apply additional and/or custom modifications to the quote.

The price level 320 section identifies a difficulty level for the service. As discussed herein, a higher price level can indicate a higher difficulty level for executing the service, and the price for the service item will be increased accordingly. In some embodiments, the price level can be used for data collection purposes, and need not affect the price of the service item. The effect of any of the service item variables discussed herein can be modified, as desired by one or more of the technician, pricebook manager, and the like.

The rule definition can further include a scheduled start time. As described herein, services occurring outside of normal business hours, e.g., services occurring between 7 pm and 7 am, may be subject to an additional service time, due to such reasons such as time and inconvenience. Accordingly, service time selections at certain times can trigger an additional surcharge to be added to the estimate.

The price calculation 330 selection can provide the option to price the service item based on the rule or the service price, for example. The service item will be associated with a base price, often based on an estimated service time, cost of materials, and the like. The addition of one or more rules can be optionally implemented, based on one or more variable described herein.

The price calculation 330 section can further breakdown the cost estimate between the base service price 350 and any additional modifiers, such as add-on services. The service price 350 can include, but are not limited to, labor, markup, and surcharge prices, which may each be defined by the technician and/or estimate generator. The add-on modifiers indicate an additional product or service that may not typically be associated with the service item at hand, but has been added to the particular service. Any changes to one or more variables in the rule can result in a dynamic price adjustment to the total price 350.

Figure 4A:
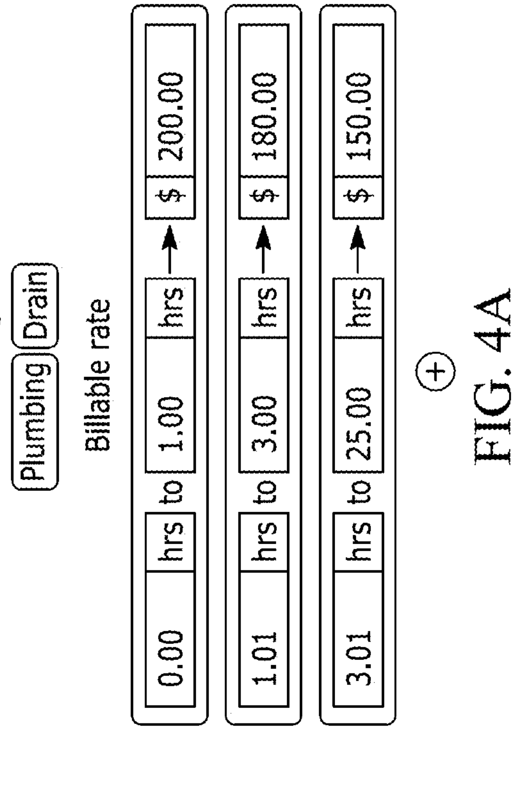
FIG. 4A illustrates an example of a dynamic pricing adjustment to a billable rate, in accordance with embodiments.

FIGS. 4A-4D illustrate example variables that can contribute a dynamic pricing adjustment and subsequent estimate. As described herein, and provided in FIG. 4A, a billable rate can be provided for technician's labor time and corresponding expense. In some examples, a service can provide a fixed billable rate, e.g., $100/hour, for the duration of the service. In other examples, a dynamic rate can be implemented to account for an extended time of service. As illustrated in FIG. 4A, a technician can provide a billable rate of $200 for the first hour of service, a rate of $180 for 1.01 to 3.00 hours of service and a rate of $150 for 3.01 to 25.00 hours of service. In this manner, longer service times would provide the customer with a discounted rate. Such rates can be individually defined, based on a type of service. Accordingly, in some examples the billable rate may increase the longer the service time, decrease the longer the service time, or remain static despite a service time length.

Figure 4B:
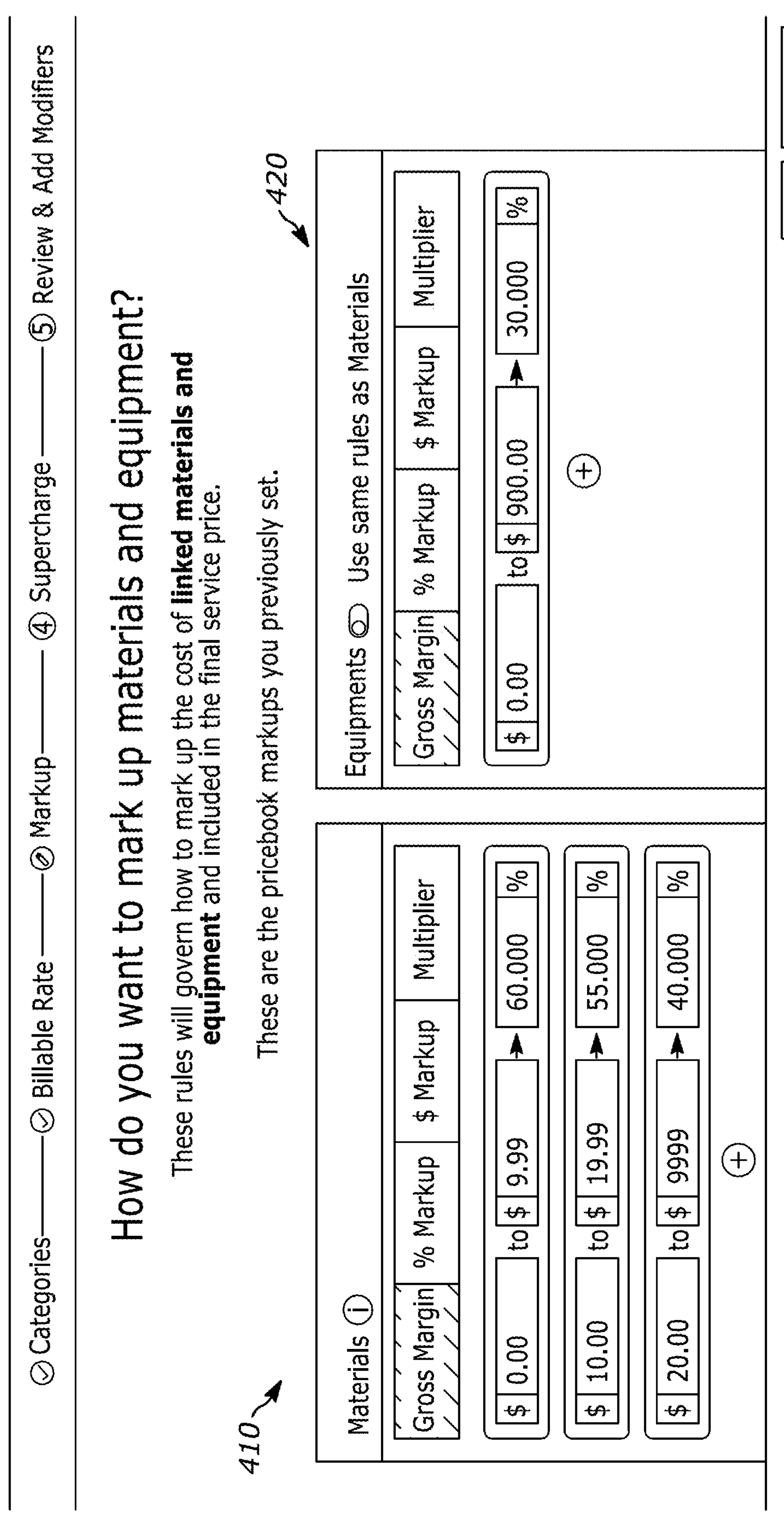
FIG. 4B illustrates an example of a dynamic pricing adjustment materials and equipment, in accordance with embodiments.

FIG. 4B illustrates a markup option 400, which can be implemented to define one or more rules. In embodiments, the rule will govern how to mark up the cost of a material, equipment, service, or the like, and become incorporated into a final service price. In examples, the materials markup 410 and the equipment markup 420 can be separated, so that each can be individually assigned. In embodiments, the two categories can be combined, and/or additional categories can be introduced.

The materials markup 410 can be further defined based on a desired gross margin, a markup percentage, a markup cost, and a multiplier. It will be appreciated that the categories need not be illustrated to those depicted in FIG. 4B and can be custom-defined and edited based on the particular service, variables of interest, and the like.

The equipment markup 420 may provide the option to match and apply the same rules as the materials markup 410. Accordingly, the reverse can occur as well, wherein an option to match the materials markup 410 to the equipment markup is provided. Similar variables, such as gross margin, a percentage markup, a dollar markup, and a multiplier can be applied. It will be appreciated that the materials markup 410 and equipment markup 420 can be individually-defined, similarly defined, and include one or more sub-rules, based on the desired service adjustments.

FIG. 4C illustrates an option to include additional surcharges to a service item. The additional charge can be a flat amount, e.g., $X per item added to the invoice, and/or a percentage surcharge, e.g., Y % of the service item cost, added to the invoice. It will be appreciated that the surcharge can be optionally added to service items, and need not be added.

FIG. 4D illustrates a user interface summarizing a defined rule. In the illustrated example, the rule is defined as a basic rule that applies to plumbing and drain services. In examples, each type of service can encompass one or more services and items, and/or be defined to specifically apply to certain items.

In addition, the rule defines the billable rate for the technician and/or service provider. In the present example, the rates described in FIG. 4A are applied to present rule. The materials have further been assigned with a defined markup cost. Here, any materials between $0 and $9.99 have a 60% markup, materials costing between $10-$19.99 have a 55% markup, and materials between $20 and $9,999 have a 40% markup. Such materials markups can apply to individual materials, a total cost of materials, or a combination, depending on the defined rule of the technician and/or estimate generator. An equipment markup can additionally be applied. In FIG. 4D, an equipment markup of 30% is being applied for equipment between $0-$900. A surcharge can further be included in the dynamic pricing estimate. In the present case, a 12% surcharge is being added to the estimated service. As discussed herein, it will be appreciated that any of the variables included in the dynamic pricing estimate can be included, omitted, and/or adjusted based on the desired rule definitions and service pricing.

FIG. 5 illustrates an example of optional dynamic pricing modifications in accordance with embodiments. It will be appreciated that the following are provided by way of example and embodiments are not limited the modifications presented herein. As illustrated in FIG. 5A, discounts and/or surcharges can be added to any of the dynamic pricing modifications presented herein. For example, add-on pricing 510 can be added to services and equipment that, for example, technicians mark as additional to another task. For example, if a technician arrives to replace a toilet system, and discovers that additional pipes and valves need replacing, the materials associated with the additional service can be included as add-on pricing. In certain scenarios, the additional service may require an upcharge, e.g., due to the service time becoming longer than anticipated, the need to obtain materials and equipment for the unanticipated service, etc. These factors can be included in the add-on pricing modifications provided by the dynamic pricing systems and methods presented herein.

After hours services 520 are another example when there may be modifications to an initial price estimate. As discussed herein, services occurring outside of normal business hours can automatically include an upcharge, due to the unexpected rush required by the service provider. The times that qualify as “after hours” can be defined by the technician and/or varied by the service. Accordingly, both services and technicians may have differing after hours times. Such flexibility allows for dynamic adjustments between service providers and types of service, and allows for more accurate and tailored estimates.

A price level modification 530 relates to a service difficulty level, as described herein. When services require additional effort or expertise, an additional charge can be added to the price estimate. This ability enables technicians and service providers to provide customers with more accurate estimates, which reflect the level of difficulty and service being provided.

Static price adjustments 540 allows exceptions to be made to particular services and/or products. For example, a simple drain clearing service can be excluded from the above rules. This feature can be particularly useful to common services, for example, to ensure that an expected, uniform price is presented. Such rules can also be applied to specific services, which technicians and service providers wish to exclude from the typical service item adjustments. For example, unique or atypical services may be excluded from rules.

Figure 5A:
FIG. 5A illustrates another example of a dynamic pricing modification, in accordance with embodiments.
Figure 5B:
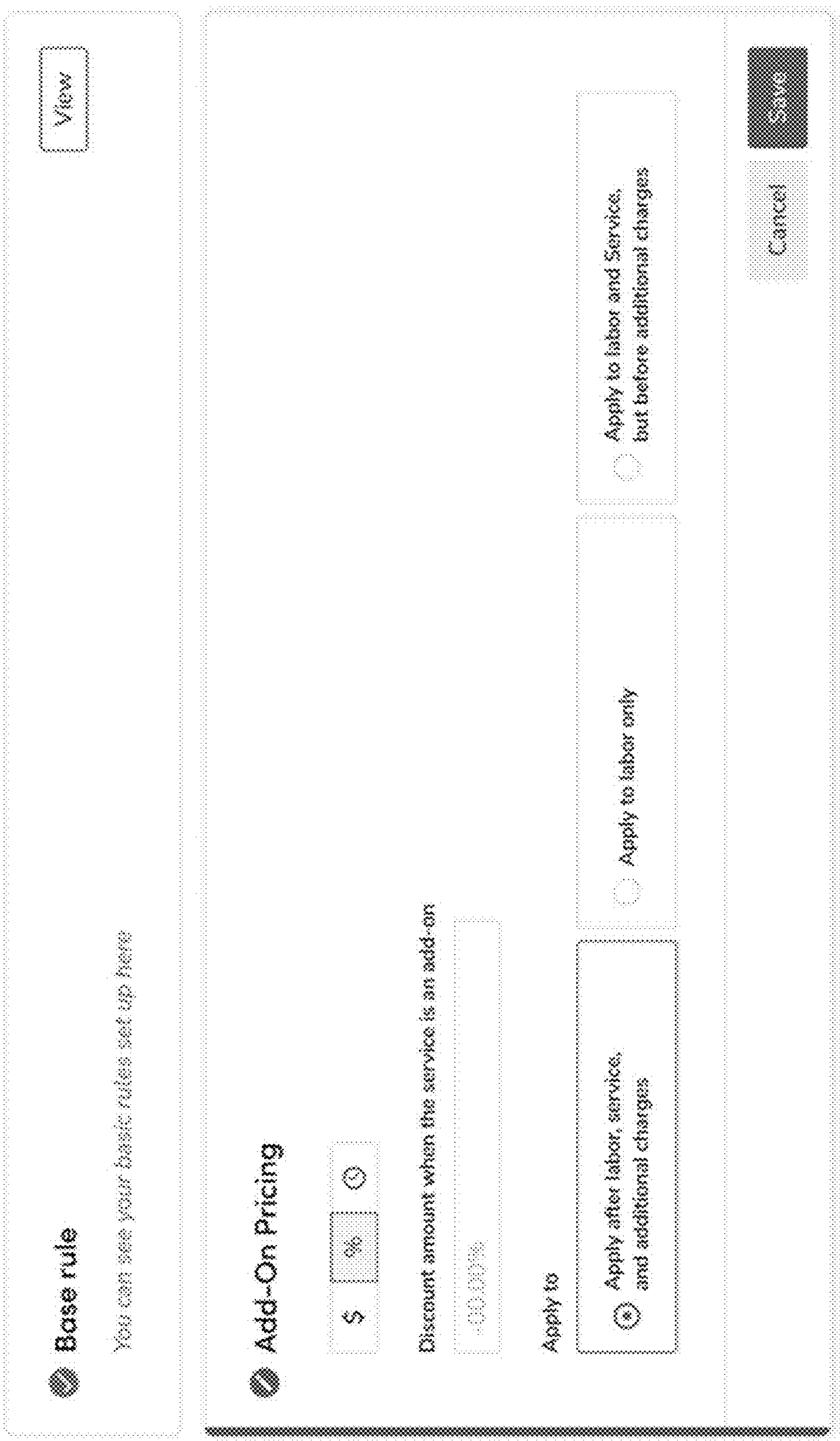
FIG. 5B illustrates an example of a dynamic pricing modification, in accordance with embodiments.

FIG. 5B illustrate an example user interface for an add-on pricing adjustment, as discussed herein. The user interface can include a base rule option, which brings users to a summary page indicating the factors included in the defined rule. The add-on pricing adjustment can be made as a fixed price amount, a percentage increase, and/or a time increase. As illustrated in FIG. 5B, the selected type of add-on pricing, in this case, a percentage added to the service item amount, has the option to be (i) applied after labor service, and additional charges; (ii) applied to labor only; or (iii) applied to labor and service, but before additional charges. Such options provide the technician and/or estimate generator with flexibility to tailor the estimate to the particular customer and the specific job.

Figure 5C:
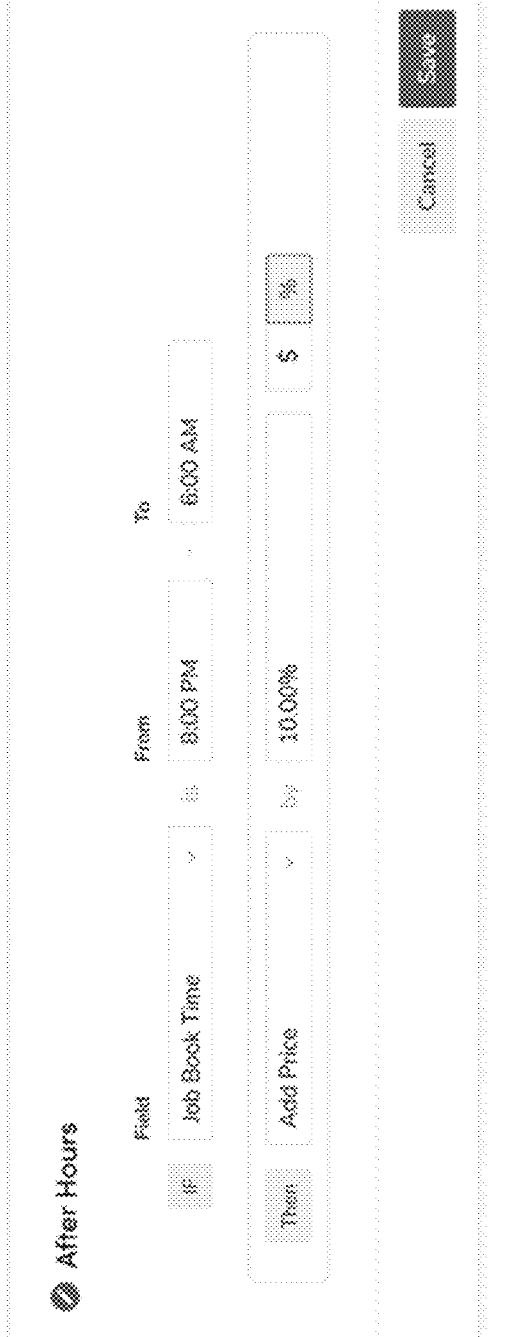
FIG. 5C illustrates an example of dynamic pricing adjustment based on a service time, in accordance with embodiments.

FIG. 5C illustrates an after-hours interface, in accordance with embodiments. The after-hours interface allows modification of (i) the times of after hours service; and (ii) the price for after hours service. The after hours times can be defined, for example, form 8 pm-6 am, such that the defined price gets applied to the service if it is booked and/or occurs during that time range. The price can also be adjusted, e.g., as an additional percentage of the normal price (e.g., 10% added to the typical price of service), or a fixed dollar amount on top of the original service price. It will be appreciated that various jobs and services can be defined with different after hours times, and after hours prices. This allows flexibility and customization with regard to the type of service, and assists in providing a more accurate estimate to customers.

Figure 5D:
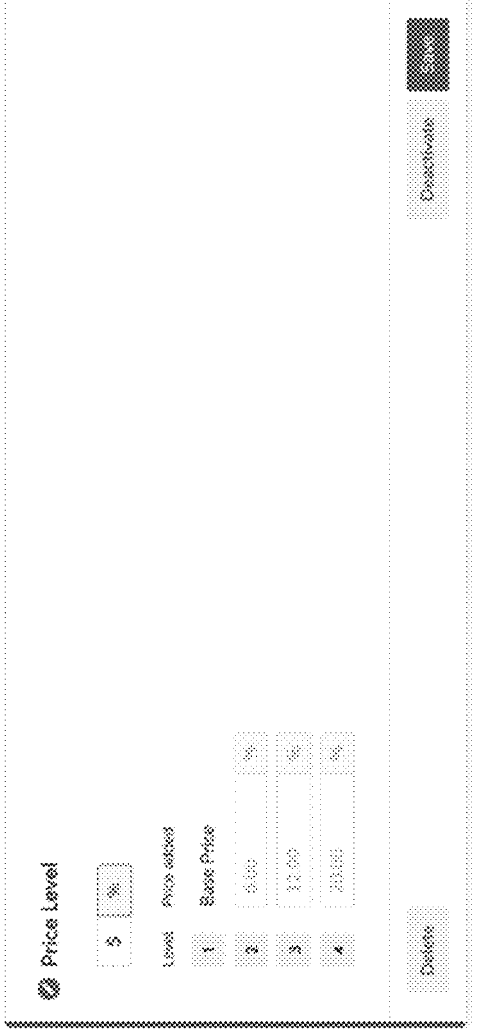
FIG. 5D illustrates an example of a dynamic pricing adjustment related to a difficulty level, in accordance with embodiments.

FIG. 5D illustrates a price level interface, in accordance with embodiments. As described herein, service prices can be adjusted based on a selected difficulty level for the service. The price level modification enables each level of difficulty to be associated with a particular price adjustment. Similar to the after hours adjustment, the price level adjustment can be defined based on a fixed amount, or by a percentage amount. Each price level can be associated with a different price increase.

In the illustrated example, a level 1 price level corresponds to the typical base price for the service. A level 2 price level corresponds to a 6% increase to the base price for the service. A level 3 price level corresponds to a 12% increase to the base price for the service. A level 4 price level corresponds to a 20% increase to the base price for the service.

Figure 6:
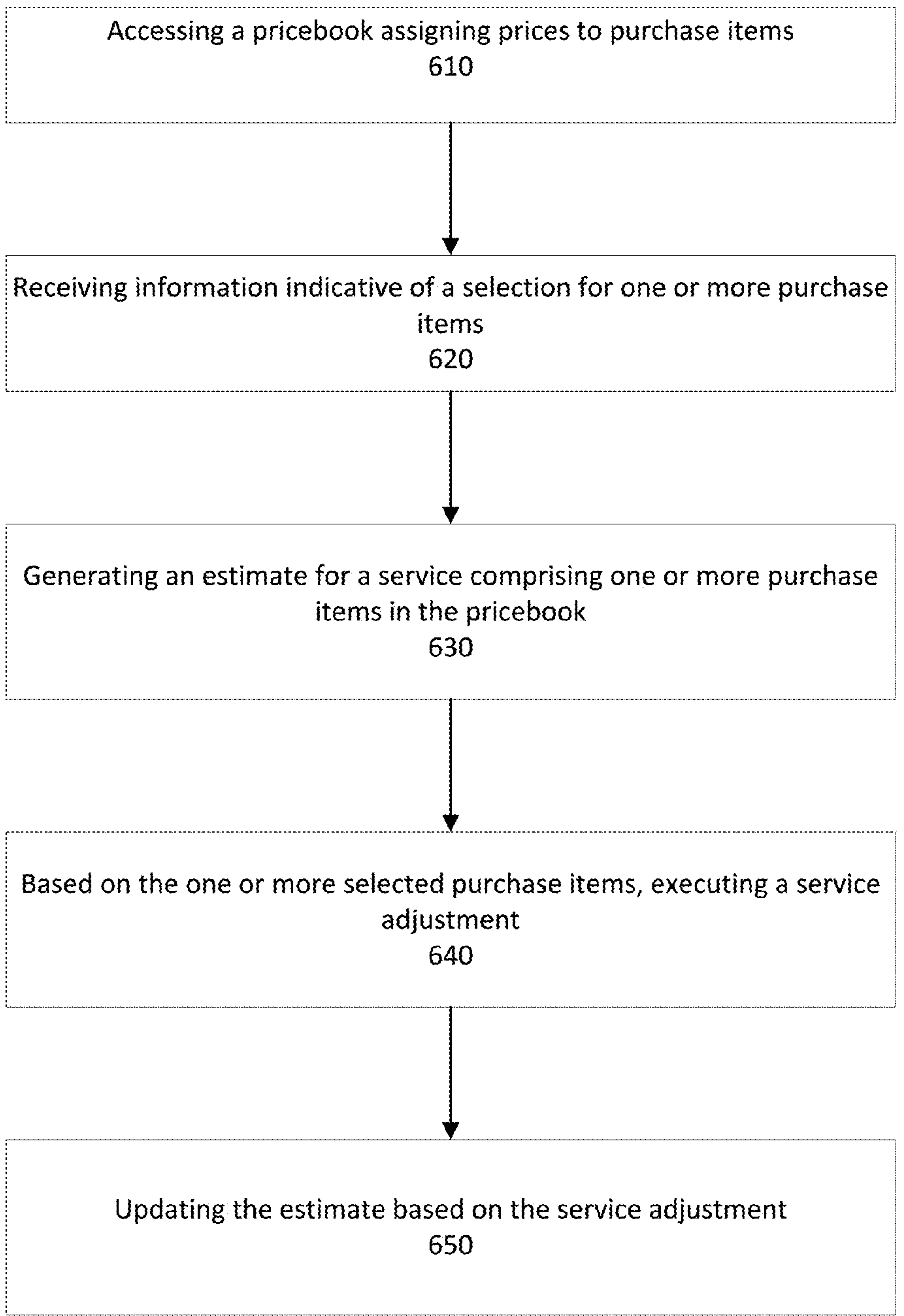
FIG. 6 illustrates an example dynamic pricing adjustment in accordance with embodiments.

FIG. 6 illustrates an example method for generating a service item recommendation in accordance with embodiments discussed herein. Systems and methods can access a pricebook assigning prices to purchase items 610. The pricebook may be hosted, for example, at one or more remote servers, and managed by one or more remote computing devices. In addition, the pricebook may be accessed, for example, at a user interface. The user interface can be a computing device, mobile computing device, smart phone, tablet, interactive display device, and/or other graphical user interface. A user can search for and select service items based on any of the various examples discussed herein.

Systems and methods can further receive information indicative of a selection for one or more pricebook items 620. Such selections can be selections at the user interface, for example, by a technician or other individual generating an estimate. The estimate can then be generated for a service comprising one or more purchase items in a pricebook. In examples, a service can comprise a plurality of tasks, products, and materials, to adequately complete the service. Each of these tasks, products, and materials can be defined in a master pricebook, as discussed herein.

In various examples, the pricebook items can be purchase items such as goods and services. Goods can comprise at least one of: materials, equipment, rental expenses, insurance expenses, and vehicle fees. Services can comprise at least one of: a labor expense, an hourly rate, and an additional task, e.g., add-on task.

Based on one or more selected purchase items, a service adjustment can be executed 640. As described herein, the service adjustment can be based on one or more rules, as defined by the technician and/or estimate generator. Such adjustments can include, but are not limited to add-on adjustments, after hours adjustments, price level/difficulty adjustments, and/or static adjustments, including discounts. Accordingly, based on the service adjustment, the estimate can be updated.

In various examples, the service adjustment can comprise identifying one or more rules associated with the service item(s), and being indicative of a price adjustment. In addition, prices for one or more service items can be based on the service adjustment.

Figure 7:
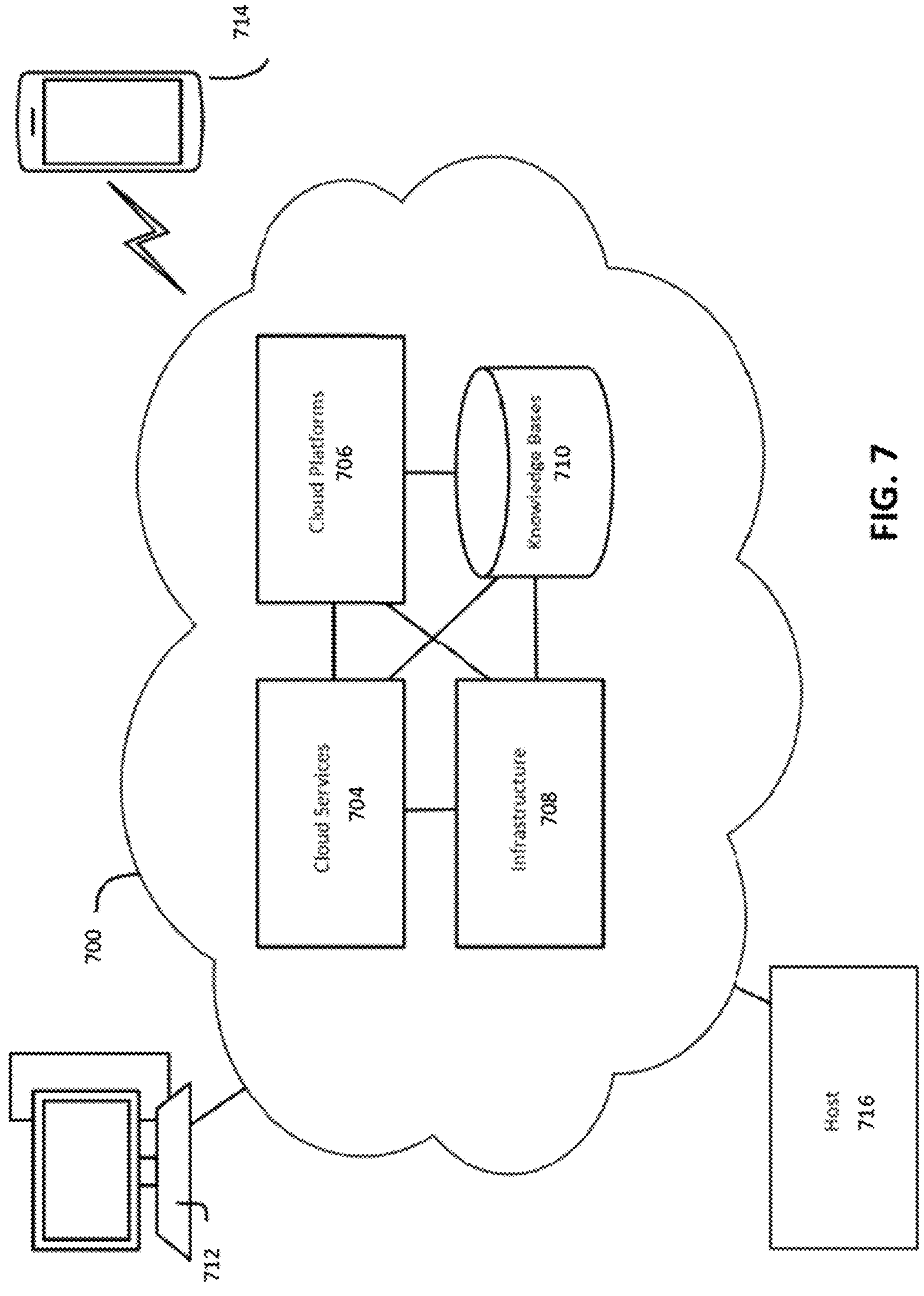
FIG. 7 illustrates a cloud computing system in accordance with embodiments.

FIG. 7 shows example components of a cloud computing system 700. By way of example and without limitation, cloud computing system 700 may be used to perform aspects of the disclosed subject matter. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and by other cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. By way of example and without limitation, a PC user device accessing a cloud-based application may not be aware that the PC downloads program logic and/or data from the cloud computing system, or that the PC offloads processing or storage functions to the cloud computing system, for example.

In FIG. 7, cloud computing system 700 includes one or more cloud services 74, one or more cloud platforms 706, cloud infrastructure components 708, and cloud knowledge bases 710. Cloud computing system 700 may include more of fewer components, and each of cloud services 704, cloud platforms 706, cloud infrastructure components 708, and cloud knowledge bases 710 may include multiple computing and storage elements as well. Thus, one or more of the described functions of cloud computing system 700 may be divided into additional functional or physical components, or combined into fewer functional or physical components. In some further examples, additional functional and/or physical components may be added to the examples shown in FIG. 7. Delivery of cloud computing based services may involve multiple cloud components communicating with each other over application programming interfaces, such as web services and multi-tier architectures, for example.

Example cloud computing system 700 shown in FIG. 7 is a networked computing architecture. Cloud services 704 may represent queues for handling requests from client devices. Cloud platforms 706 may include client-interface frontends for cloud computing system 700, such as client-interface frontends of a messaging service. Cloud platforms 706 may be coupled to cloud services 704 to perform functions for interacting with client devices. Cloud infrastructure 708 may include service, billing, and other operational and infrastructure components of cloud computing system 700. Cloud knowledge bases 710 are configured to store data for use by cloud computing system 700, and thus, cloud knowledge bases 710 may be accessed by any of cloud services 704, cloud platforms 706, and/or cloud infrastructure components 708.

Many different types of client devices, such as devices of users of the messaging service, may be configured to communicate with components of cloud computing system 700 for the purpose of accessing data and executing applications provided by cloud computing system 700. For example, a computer 712, a mobile device 714, and a host 716 are shown as examples of the types of client devices that may be configured to communicate with cloud computing system 700. Of course, more or fewer client devices may communicate with cloud computing system 700. In addition, other types of client devices may also be configured to communicate with cloud computing system 700 as well.

Computer 712 shown in FIG. 7 may be any type of computing device, e.g., PC, laptop computer, tablet computer, etc., and mobile device 714 may be any type of mobile computing device, e.g., laptop, smartphone, mobile telephone, cellular telephone, tablet computer, etc., configured to transmit and/or receive data to and/or from cloud computing system 100. Similarly, host 716 may be any type of computing device with a transmitter/receiver including a laptop computer, a mobile telephone, a smartphone, a tablet computer etc., which is configured to transmit/receive data to/from cloud computing system 700.

In FIG. 7, communication links between client devices and cloud 700 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with cloud computing system 100 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices may connect to cloud computing system 700 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, biometric devices, mobile computing devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A number of different types of computing devices may be used singly or in combination to implement the resources and services in different embodiments, including general-purpose or special-purpose computer servers, storage devices, network devices, and the like. In at least some embodiments, a server or computing device that implements at least a portion of one or more of the technologies described herein, including the techniques to implement the functionality of aspects discussed herein.

Figure 8:
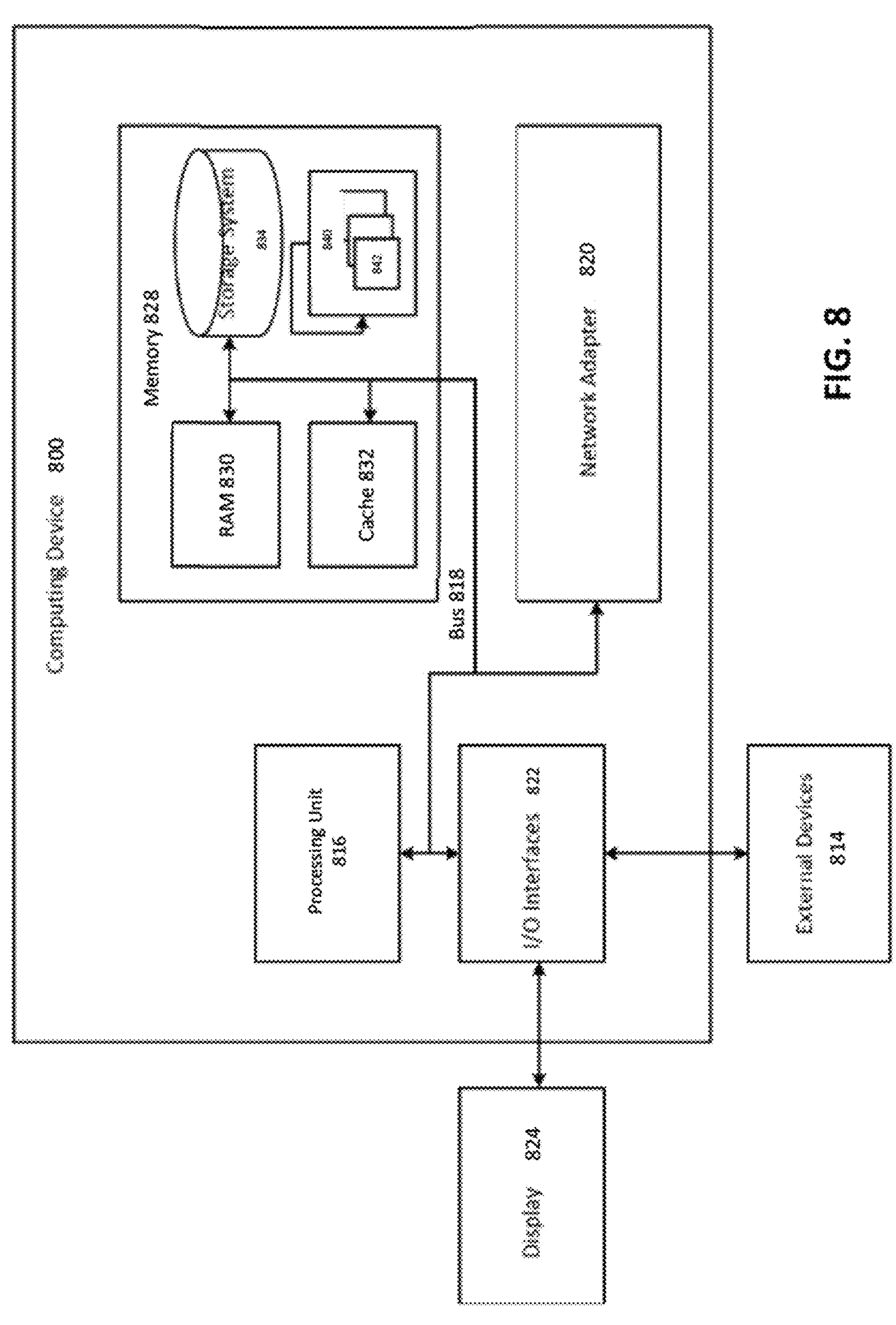
FIG. 8 shows an example computing device which may be used to perform any of the techniques disclosed herein.

FIG. 8 shows such a general-purpose computing device 800. The computing device 800 may operate in a virtual environment, such as the environment 1000 in FIG. 10. Computing device 800 may be used to host the messaging service or the messaging application. Computing device 800 may be configured to communicate with devices of users of the messaging application. Computing device 800 may be a general-purpose computing device. Computing device 800 may be an on-premises device, such as a node of a distributed system running in a user's data center. The components of computing device 800 may include, but are not limited to, one or more processors or processing units 816, a system memory 828, and a bus 818 that couples various system components including system memory 828 to processor 816.

The bus 818 in the example of FIG. 8 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnects ('PCI') bus.

Computing device 800 may include a variety of computer system readable media. Such media may be any available media that is accessible by computing device 800, and it includes both volatile and non-volatile media, removable and non-removable media. Computing device 800 may include system memory 828, which may include computer system readable media in the form of volatile memory, such as random access memory (RAM') 830 and/or cache memory 832. Computing device 800 may further include other removable/non-removable, volatile/non-volatile computer system storage media. By way of example only, a storage system 834 may be provided for reading from and writing to a non-removable, non-volatile magnetic media (not shown and typically called a "hard drive"). Although not shown, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media may be provided. In such instances, each may be connected to bus 818 by one or more data media interfaces. As will be further depicted and described below, memory 828 may include at least one program product having a set, e.g., at least one, of program modules that are configured to carry out the functions of embodiments of the invention.

Computing device 800 may include a program/utility 840 having a set (at least one) of program modules 842 that may be stored in memory 828. Computing device 800 of FIG. 8 may also include an operating system, one or more messaging application programs, other messaging application program modules, and messaging application program data. Each of the operating system, one or more messaging application programs, other messaging application program modules, and messaging application program data or some combination thereof, may include an implementation of a networking environment, such as the cloud computing system 100 in FIG. 1. Program modules 842 generally carry out the functions and/or methodologies of embodiments of the invention as described herein.

Computing device 800 of FIG. 8 may also communicate with one or more external devices 814 such as a keyboard, a pointing device, a display 824, and so on that enable a user to interact with computing device 800. Computing device 800 may also include any devices, e.g., network card, modem, etc., that enable computing device 800 to communicate with one or more other computing devices. Such communication may occur, for example, via I/O interfaces 821. Still yet, computing device 800 may communicate with one or more networks such as a local area network ('LAN'), a general wide area network ('WAN'), and/or a public network, e.g., the Internet, via network adapter 820. As depicted, network adapter 820 communicates with the other components of computing device 800 via bus 818. It should be understood that although not shown, other hardware and/or software components could be used in conjunction with computing device 800. Examples include, but are not limited to, microcode, device drivers, redundant processing units, external disk drive arrays, RAID systems, tape drives, and data archival storage systems, and so on.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Embodiments

Embodiment 1. A system for dynamically generating pricing estimates, comprising: one or more processors; and a computer-readable medium comprising instructions stored therein, which when executed by the processors, cause the processors to perform operations comprising: accessing, at a remote server, a pricebook assigning prices to purchase items; receiving information indicative of a selection for one or more purchase items; generating an estimate for a service comprising one or more purchase items in the pricebook; based on the one or more or more selected purchase items, executing a service adjustment; and updating the estimate based on the service adjustment.

Embodiment 2. The system of Embodiment 1, wherein the purchase items comprise one or more of: goods, services, and a time of service.

Embodiment 3. The system of Embodiment 2, wherein the goods comprise at least one of a material expense, an equipment expense, a rental expense, an insurance expense, and a vehicle fee.

Embodiment 4. The system of Embodiment 2, wherein the services comprise at least one of: a labor expense, an hourly rate, and an additional task.

Embodiment 5. The system of any of Embodiments 1-4, wherein the service adjustment relates to one or more of: a time of service, a difficulty level, an additional charge, and an add-on task.

Embodiment 6. The system of Embodiment 5, wherein when the time of service is outside a predefined time range, a surcharge is added to at least one of: the labor expense and the hourly rate.

Embodiment 7. The system of Embodiment 5, wherein the difficulty level increases the estimate by at least one of a fixed amount, and a percentage cost increase of the service.

Embodiment 8. The system of any of Embodiments 1-7, wherein executing the service adjustment comprises: identifying, at the remote server, one or more defined rules associated with the selected one or more purchase items, wherein the rules are associated with price adjustments; and applying the one or more defined rules to applicable service items in the estimate.

Embodiment 9. The system of any of Embodiments 1-9, further comprising: generating a rule defining a service adjustment; and adjusting a price for one or more purchase items in the estimate based on the service adjustment.

Embodiment 10. A computer-implemented method for dynamically generating pricing estimates, comprising: accessing, at a remote server, a pricebook assigning prices to purchase items; receiving information indicative of a selection for one or more purchase items; generating an estimate for a service comprising one or more purchase items in the pricebook; based on the one or more or more selected purchase items, executing a service adjustment; and updating the estimate based on the service adjustment.

Embodiment 11. The computer-implemented method of Embodiment 10, wherein executing the service adjustment comprises: identifying, at the remote server, one or more defined rules associated with the selected one or more purchase items, wherein the rules are associated with price adjustments; and applying the one or more defined rules to applicable service items in the estimate.

Embodiment 12. The computer-implemented method of any of Embodiments 10-11, wherein the purchase items comprise one or more of: goods, services, and a time of service.

Embodiment 13. The computer-implemented method of any of Embodiments 10-12, wherein the service adjustment relates to one or more of: a time of service, a difficulty level, an additional charge, and an add-on task.

Embodiment 14. The computer-implemented method of any of Embodiments 10-13, further comprising: generating a rule defining a service adjustment; and adjusting a price for one or more purchase items in the estimate based on the service adjustment.

Embodiment 15. A non-transitory computer-readable storage medium comprising instructions stored therein, which when executed by one or more processors, cause the processors to perform operations comprising: accessing, at a remote server, a pricebook assigning prices to purchase items; receiving information indicative of a selection for one or more purchase items; generating an estimate for a service comprising one or more purchase items in the pricebook; based on the one or more or more selected purchase items, executing a service adjustment; and updating the estimate based on the service adjustment.

Embodiment 16. The non-transitory computer-readable storage medium of Embodiment 15, further comprising: identifying, at the remote server, one or more defined rules associated with the selected one or more purchase items, wherein the rules are associated with price adjustments; and applying the one or more defined rules to applicable service items in the estimate.

Embodiment 17. The non-transitory computer-readable storage medium of any of Embodiments 15-16, further comprising: generating a rule defining a service adjustment; an adjusting a price for one or more purchase items in the estimate based on the service adjustment.

Embodiment 18. The non-transitory computer-readable storage medium of any of Embodiments 15-17, wherein the purchase items comprise one or more of: goods, services, and a time of service.

Embodiment 19. The non-transitory computer-readable storage medium of any of Embodiments 15-18, wherein the service adjustment relates to one or more of: a time of service, a difficulty level, an additional charge, and an add-on task.

Embodiment 20. The non-transitory computer-readable storage medium of Embodiment 19, wherein when the time of service is outside a predefined time range, a surcharge is added to at least one of: the labor expense and the hourly rate, and wherein the difficulty level increases the estimate by at least one of a fixed amount, and a percentage cost increase of the service.

What is claimed is:

1. A system for dynamically generating pricing estimates, comprising:

one or more processors; and a computer-readable medium comprising instructions stored therein, which when executed by the processors, cause the processors to perform operations comprising:

generating, on a graphical user interface, a first menu comprising a first plurality of selections indicative of available products and services;

in response to a detected user selection of a product or service from the first menu, initiating a connection with a remote server to access a pricebook stored in a cloud database indicating prices for service items;

rendering on the graphical user interface, an estimate for the selected product or service providing, via the graphical user interface, a second plurality of selectable options indicative of one or more recommended service items to be added to the estimate, wherein the recommended service items are commonly sold with the selected product or service based on prior invoices and are associated with the product or service in the estimate;

in response to a user selection of a recommended service item from the second plurality of selectable options, updating the estimate to include the recommended service item and displaying, via the graphical user interface, a third plurality of selectable options indicative of price adjustment options for the product or service, wherein the price adjustment options include one or more of labor, markup, and surcharge;

in response to a user selection from the third plurality of selectable options for a price adjustment, applying a rule indicative of the price adjustment to the product or service; and dynamically updating, within a price-calculation section of the graphical user interface, an estimate of a price of the service item based on the price adjustment, wherein any changes to one or more variables associated with the rule results in a dynamic price adjustment, wherein in response to adding the recommended service item to the estimate, the second plurality of selectable options is dynamically updated to provide updated recommended service items based on the addition of the recommended service item.

2. The system of claim 1, wherein the purchase items comprise one or more of goods, services, and a time of service.

3. The system of claim 2, wherein the goods comprise at least one of a material expense, an equipment expense, a rental expense, an insurance expense, and a vehicle fee.

4. The system of claim 2, wherein the services comprise at least one of: a labor expense, an hourly rate, and an additional task.

5. The system of claim 1, wherein the service adjustment relates to one or more of: a time of service, a difficulty level, an additional charge, and an add-on task.

6. The system of claim 5, wherein when the time of service is outside a predefined time range, a surcharge is added to at least one of: the labor expense and the hourly rate.

7. The system of claim 5, wherein the difficulty level increases the estimate by at least one of a fixed amount, and a percentage cost increase of the service.

8. The system of claim 1, wherein executing the service adjustment comprises: identifying, at the remote server, one or more defined rules associated with the selected one or more purchase items, wherein the rules are associated with price adjustments; and applying the one or more defined rules to applicable service items in the estimate.

9. The system of claim 1, further comprising: generating a rule defining a service adjustment; and adjusting a price for one or more purchase items in the estimate based on the service adjustment.

10. A computer-implemented method for dynamically generating pricing estimates, comprising:

generating, on a graphical user interface, a first menu comprising a first plurality of selections indicative of available products and services;

in response to a detected user selection of a product or service from the first menu, initiating a connection with a remote server to access a pricebook stored in a cloud database indicating prices to purchase items;

rendering on the graphical user interface, an estimate for the selected product or service providing, via the graphical user interface, a second plurality of selectable options indicative of one or more recommended service items to be added to the estimate, wherein the recommended service items are commonly sold with the selected product or service based on prior invoices and are associated with the product or service in the estimate;

in response to a user selection of a recommended service item from the second plurality of selectable options, updating the estimate to include the recommended service item and displaying, via the graphical user interface, a third plurality of selectable options indicative of price adjustment options for the product or service, wherein the price adjustment options include one or more of labor, markup, and surcharge;

in response to a user selection from the third plurality of selectable options for a price adjustment, applying a rule indicative of the price adjustment to the product or service; and dynamically updating, within a price-calculation section of the graphical user interface, an estimate of a price of the service item based on the price adjustment, wherein any changes to one or more variables in the rule results in a dynamic price adjustment, wherein in response to adding the recommended service item to the estimate, the second plurality of selectable options is dynamically updated to provide updated recommended service items based on the addition of the recommended service item.

11. The computer-implemented method of claim 10, wherein executing the service adjustment comprises: identifying, at the remote server, one or more defined rules associated with the selected one or more purchase items, wherein the rules are associated with price adjustments; and applying the one or more defined rules to applicable service items in the estimate.

12. The computer-implemented method of claim 10, wherein the purchase items comprise one or more of: goods, services, and a time of service.

13. The computer-implemented method of claim 10, wherein the service adjustment relates to one or more of: a time of service, a difficulty level, an additional charge, and an add-on task.

14. The computer-implemented method of claim 10, further comprising: generating a rule defining a service adjustment; and adjusting a price for one or more purchase items in the estimate based on the service adjustment.

15. A non-transitory computer-readable storage medium comprising instructions stored therein, which when executed by one or more processors, cause the processors to perform operations comprising:

generating, on a graphical user interface, a first menu comprising a first plurality of selections indicative of available products and services;

in response to a detected user selection of a product or service from the first menu, initiating a connection with a remote server to access a pricebook stored in a cloud database assigning prices to purchase items;

rendering, on the graphical user interface, an estimate for the selected product or service; providing, via the graphical user interface, a second plurality of selectable options indicative of one or more recommended service items to be added to the estimate, wherein the recommended service items are commonly sold with the selected product or service based on prior invoices and are associated with the product or service in the estimate;

in response to a user selection of a recommended service item from the second plurality of selectable options, updating the estimate to include the recommended service item and displaying, via the graphical user interface, a third plurality of selectable options indicative of price adjustment options for the product or service, wherein the price adjustment options include one or more of labor, markup, and surcharge;

in response to a user selection from the third plurality of selectable options for a price adjustment, applying a rule indicative of the price adjustment to the product or service; and dynamically updating, within a price-calculation section of the graphical user-interface, an estimate of a price of the service item based on the price adjustment, wherein any changes to one or more variables in the rule results in a dynamic price adjustment, wherein in response to adding the recommended service item to the estimate, the second plurality of selectable options is dynamically updated to provide updated recommended service items based on the addition of the recommended service item.

16. The non-transitory computer-readable storage medium of claim 15, further comprising: identifying, at the remote server, one or more defined rules associated with the selected one or more purchase items, wherein the rules are associated with price adjustments; and applying the one or more defined rules to applicable service items in the estimate.

17. The non-transitory computer-readable storage medium of claim 15, further comprising: generating a rule defining a service adjustment; an adjusting a price for one or more purchase items in the estimate based on the service adjustment.

18. The non-transitory computer-readable storage medium of claim 15, wherein the purchase items comprise one or more of: goods, services, and a time of service.

19. The non-transitory computer-readable storage medium of claim 15, wherein the service adjustment relates to one or more of: a time of service, a difficulty level, an additional charge, and an add-on task.

20. The non-transitory computer-readable storage medium of claim 19, wherein when the time of service is outside a predefined time range, a surcharge is added to at least one of: the labor expense and the hourly rate, and wherein the difficulty level increases the estimate by at least one of a fixed amount, and a percentage cost increase of the service.

* * * * *